(12) United States Patent
Kashu et al.

(10) Patent No.: US 11,946,758 B2
(45) Date of Patent: Apr. 2, 2024

(54) ROUTE SELECTION DEVICE AND METHOD

(71) Applicant: TOYOTA JIDOSHA KABUSHIKI KAISHA, Toyota (JP)

(72) Inventors: Takao Kashu, Edogawa-ku (JP); Yasutaka Teramae, Kawasaki (JP); Hirotaka Kato, Nukata-gun (JP); Shuichi Morimoto, Edogawa-ku (JP); Ryo Masutani, Ota-ku (JP); Ichi Gi, Setagaya-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 17/349,553

(22) Filed: Jun. 16, 2021

(65) Prior Publication Data

US 2021/0403028 A1   Dec. 30, 2021

(30) Foreign Application Priority Data

Jun. 30, 2020   (JP) .................................. 2020-113332

(51) Int. Cl.
*G01C 21/34*   (2006.01)
*B60W 30/18*   (2012.01)
*B60W 60/00*   (2020.01)
*G06T 7/73*   (2017.01)
(Continued)

(52) U.S. Cl.
CPC ... *G01C 21/3461* (2013.01); *B60W 30/18163* (2013.01); *B60W 60/001* (2020.02); *G01C 21/3407* (2013.01); *G06T 7/73* (2017.01); *G06V 20/588* (2022.01); *B60W 2552/53* (2020.02);
(Continued)

(58) Field of Classification Search
None
See application file for complete search history.

(56) References Cited

U.S. PATENT DOCUMENTS

| 2015/0345966 | A1 | 12/2015 | Meuleau |
| 2017/0010613 | A1 | 1/2017 | Fukumoto |
| 2019/0171206 | A1* | 6/2019 | Abrams ................ B60W 40/02 |

(Continued)

FOREIGN PATENT DOCUMENTS

| CN | 105980811 A | 9/2016 |
| JP | 2009-008573 A | 1/2009 |

(Continued)

*Primary Examiner* — Vivek D Koppikar
*Assistant Examiner* — David Ruben Pedersen
(74) *Attorney, Agent, or Firm* — Oliff PLC

(57) ABSTRACT

A route selection device includes a processor configured to identify a position of a lane on which a vehicle is traveling; search for candidate partial routes leading from a current position of the vehicle to a waypoint on a route leading from a start point to a destination, the waypoint being located between the current position and the destination; determine a lane change location where a lane change will be made for each of the candidate partial routes found by searching; and select, as a partial route, a candidate partial route having a minimum total score regarding the lane change location from the candidate partial routes found by searching. The score is weighted depending on the position of the determined lane change location or whether a lane change at the lane change location can be controlled by a travel controller.

5 Claims, 7 Drawing Sheets

(51) Int. Cl.
*G06V 20/56* (2022.01)
*G06F 18/24* (2023.01)
(52) U.S. Cl.
CPC .... *G06F 18/24* (2023.01); *G06T 2207/30256* (2013.01)

(56) References Cited

U.S. PATENT DOCUMENTS

| | | | |
|---|---|---|---|
| 2020/0057447 A1 | 2/2020 | Kato et al. | |
| 2021/0364305 A1* | 11/2021 | Rizk | G01C 21/3461 |
| 2022/0135039 A1* | 5/2022 | Jardine | B60W 30/18159 |
| | | | 701/26 |

FOREIGN PATENT DOCUMENTS

| | | | | |
|---|---|---|---|---|
| JP | 2011-038794 A | | 2/2011 | |
| JP | 2015-158467 A | | 9/2015 | |
| JP | 2018197758 A | * | 12/2018 | ............ B60W 30/00 |
| JP | 2020-016600 A | | 1/2020 | |
| WO | 2018/073887 A1 | | 4/2018 | |

* cited by examiner

| TRAVEL DISTANCE (m) | AUTOMATED LC IS POSSIBLE | AUTOMATED LC IS IMPOSSIBLE |
|---|---|---|
| 0 – 500 | 1 | 2 |
| 500 – 1000 | 2 | 4 |
| 1000 – 2000 | 4 | 8 |
| 2000 – | 8 | 16 |

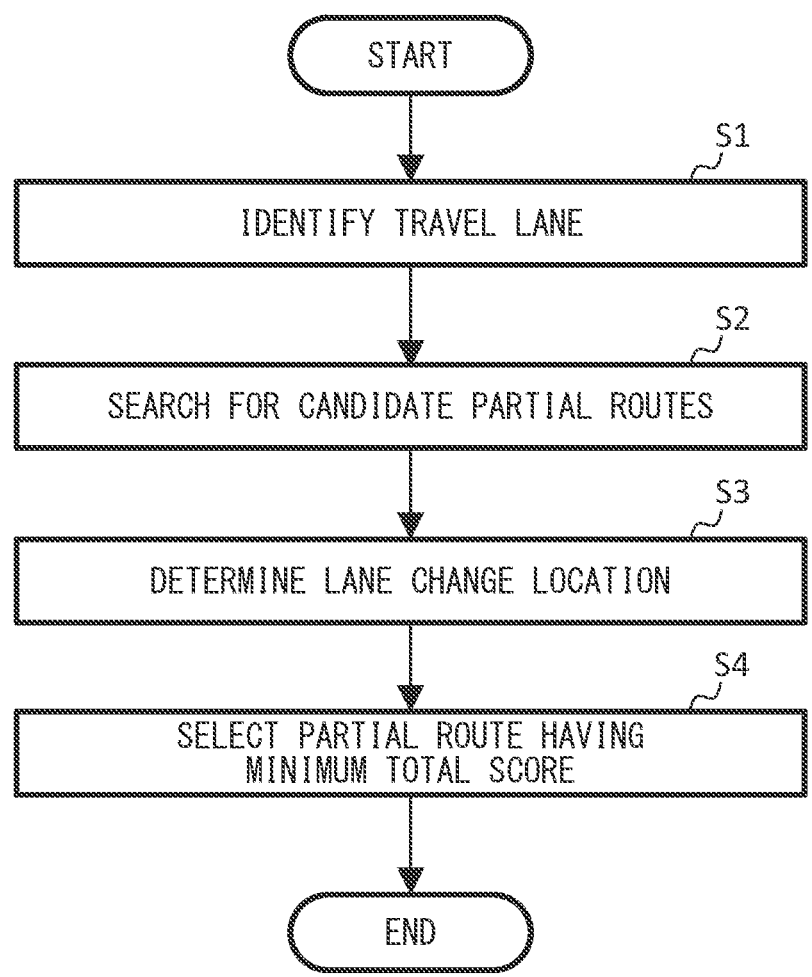

ROUTE SELECTION DEVICE AND METHOD

FIELD

The present disclosure relates to a route selection device and method for selecting a travel route of a vehicle.

BACKGROUND

A technique is known to generate routes leading from a current position of a vehicle to a destination, based on the current position and the position of the destination and to select, from these routes, an optimal route, e.g., a route such that the travel distance or the required time is the shortest.

Japanese Unexamined Patent Publication No. 2015-158467 describes a route search system that searches for a route, taking account of suitability for automated driving control. This system calculates cost values of routes, using a table defined so that a more suitable route for travel by automated driving control has a lower cost value, and searches for a route, based on the calculated cost values.

SUMMARY

On a route generated by a car navigation system without taking account of lanes, a lane change may be made at a location beyond the driver s expectations.

It is an object of the present disclosure to provide a route selection device capable of selecting a route involving fewer lane changes at locations beyond the driver s expectations.

A route selection device according to the present disclosure includes a processor configured to identify a position of a lane on which a vehicle is traveling; search for candidate partial routes leading from a current position of the vehicle to a waypoint on a route leading from a start point to a destination, the waypoint being located between the current position and the destination; determine a lane change location where a lane change will be made for each of the candidate partial routes found by searching; and select, as a partial route, a candidate partial route having a minimum total score regarding the lane change location from the candidate partial routes found by searching, the score being weighted depending on the position of the determined lane change location or whether automated travel is possible at the lane change location.

Regarding the route selection device according to the present disclosure, the score of the lane change location is preferably weighted so that the lane change location close to the waypoint has a lower score than the lane change location far from the waypoint.

Regarding the route selection device according to the present disclosure, the score of the lane change location is preferably weighted so that a lane change location where automated travel is possible has a lower score than a lane change location where automated travel is impossible.

Regarding the route selection device according to the present disclosure, the score of the lane change location is preferably weighted so that the shorter the distance to a previous lane change location, the higher the score.

The processor of the route selection device according to the present disclosure is preferably configured to select, as the partial route, a candidate partial route including fewer lane change locations from the candidate partial routes having the same total score regarding the lane change location.

The processor of the route selection device according to the present disclosure is preferably configured to select the partial route with exclusion of a candidate partial route such that a difference between a travel distance along the candidate partial route and a travel distance along a route used for control of automated travel exceeds a distance difference threshold from the candidate partial routes found by searching, the travel distance being a distance between the current position and the waypoint.

A method for selecting a route according to the present disclosure includes identifying a position of a lane on which a vehicle is traveling; searching for candidate partial routes leading from a current position of the vehicle to a waypoint on a route leading from a start point to a destination, the waypoint being located between the current position and the destination; determining a lane change location where a lane change will be made for each of the candidate partial routes found by searching; and selecting, as a partial route, a candidate partial route having a minimum total score regarding the lane change location from the candidate partial routes found by searching, the score being weighted depending on the position of the determined lane change location or whether automated travel is possible at the lane change location.

The route selection device according to the present disclosure can select a route involving fewer lane changes at locations beyond the driver s expectations.

BRIEF DESCRIPTION OF DRAWINGS

FIG. 8 is a flowchart of a route selection process.

DESCRIPTION OF EMBODIMENTS

Hereinafter, a route selection device capable of selecting a route involving fewer lane changes at locations beyond the driver expectations will be explained in detail with reference to the accompanying drawings. The route selection device identifies a position of a lane on which a vehicle is traveling, and searches for candidate partial routes leading from a current position to a waypoint on a route leading from a start point to a destination. The waypoint is located between the current position and the destination. The route selection device determines a lane change location where a lane change will be made for each of the candidate partial routes found by searching. As a partial route, the route selection device selects a candidate partial route having a minimum total score regarding the lane change location from the candidate partial routes found by searching. The score is weighted depending on the position of the determined lane change location or whether automated travel is possible at the lane change location.

Figure 1:
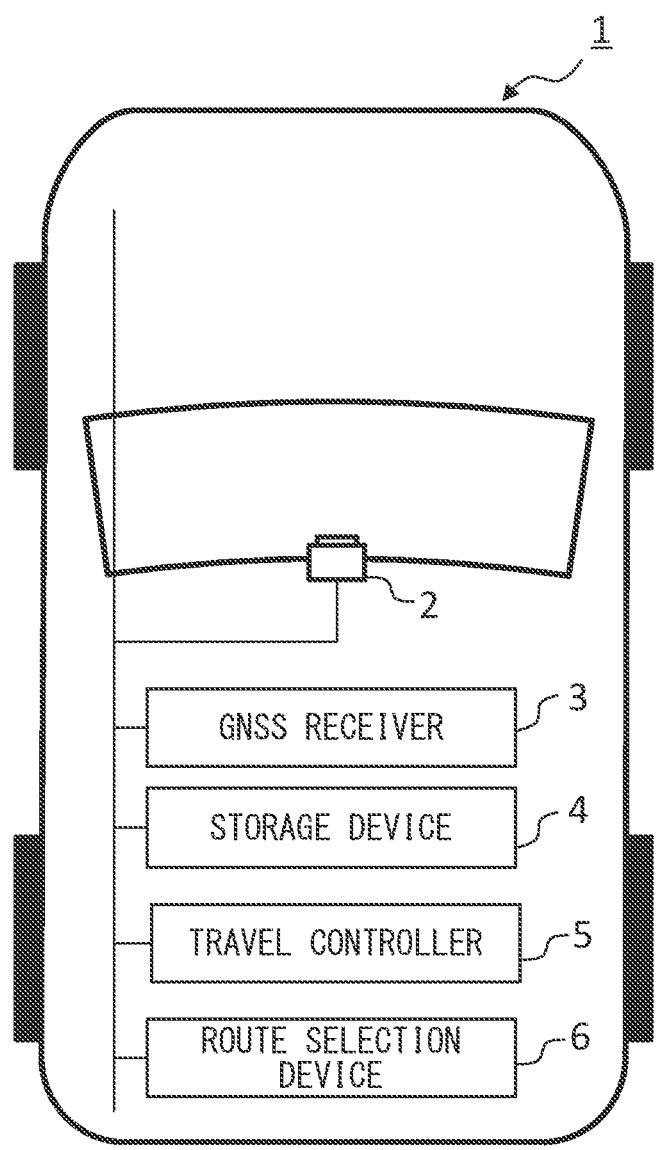
FIG. 1 schematically illustrates the configuration of a vehicle including a route selection device.

FIG. 1 schematically illustrates the configuration of a vehicle including the route selection device.

The vehicle 1 includes a camera 2, a global navigation satellite system (GNSS) receiver 3, a storage device 4, a travel controller 5, and a route selection device 6. The camera 2, the GNSS receiver 3, and the storage device 4 are connected to the travel controller 5 and the route selection device 6 via an in-vehicle network conforming to a standard, such as a controller area network, so that they can communicate with each other.

The camera 2 is an example of a sensor for detecting the surroundings of the vehicle. The camera 2 includes a two-dimensional detector constructed from an array of optoelectronic transducers, such as CCD or C-MOS, having sensitivity to infrared light and a focusing optical system focusing an image of a target region on the two-dimensional detector. The camera 2 is disposed, for example, in a front and upper area in the interior of the vehicle so as to face forward, takes a picture of the surroundings of the vehicle 1 through a windshield every predetermined capturing period (e.g., 1/30 to 1/10 seconds), and outputs images corresponding to these surroundings.

The GNSS receiver 3 receives a GNSS signal from a GNSS satellite every predetermined period, and determines the position of the vehicle 1, based on the received GNSS signal. The GNSS receiver 3 outputs a positioning signal indicating the result of determination of the position of the vehicle 1 based on the GNSS signal to the route selection device 6 via the in-vehicle network every predetermined period.

The storage device 4, which is an example of a storage unit, includes, for example, a hard disk drive or a nonvolatile semiconductor memory, and stores a high definition map. The high definition map includes, for example, information indicating signposts and road markings, such as lane division lines or stop lines, on the roads included in a predetermined region shown on this map.

The travel controller 5 is an electronic control unit (ECU) including an input/output interface, a memory, and a processor. The travel controller 5 inputs an image received from the camera 2 via the input/output interface into a classifier that has been trained to detect features shown in an image, thereby detecting features near the vehicle 1. The features herein refer to objects or signs on or near the road, and include, for example, lane division lines drawn on the road for separating lanes, and traveling vehicles other than the vehicle 1.

The classifier may be, for example, a convolutional neural network (CNN) including multiple layers connected in series from the input toward the output. A CNN that has been trained using inputted images including features to be detected as training data operates as a classifier to detect such features.

The travel controller 5 outputs a control signal to a travel mechanism (not shown) of the vehicle 1 via the input/output interface, based on features detected from received images, so that the vehicle 1 may appropriately travel on a lane in a route toward a destination. The travel mechanism includes, for example, an engine for supplying motive power to the vehicle 1, a brake for decreasing the travel speed of the vehicle 1, and a steering mechanism for steering the vehicle 1. For example, the travel controller 5 outputs a control signal to the travel mechanism so as to keep the distance to a lane division line constant. The travel controller 5 also outputs a control signal to the travel mechanism so as to keep the distance to a leading vehicle constant.

The route selection device 6 identifies the current travel lane of the vehicle, searches for candidate partial routes leading from the current position, determines lane change locations on the candidate partial routes, and selects one of the candidate partial routes as a partial route.

Figures 2, 3:
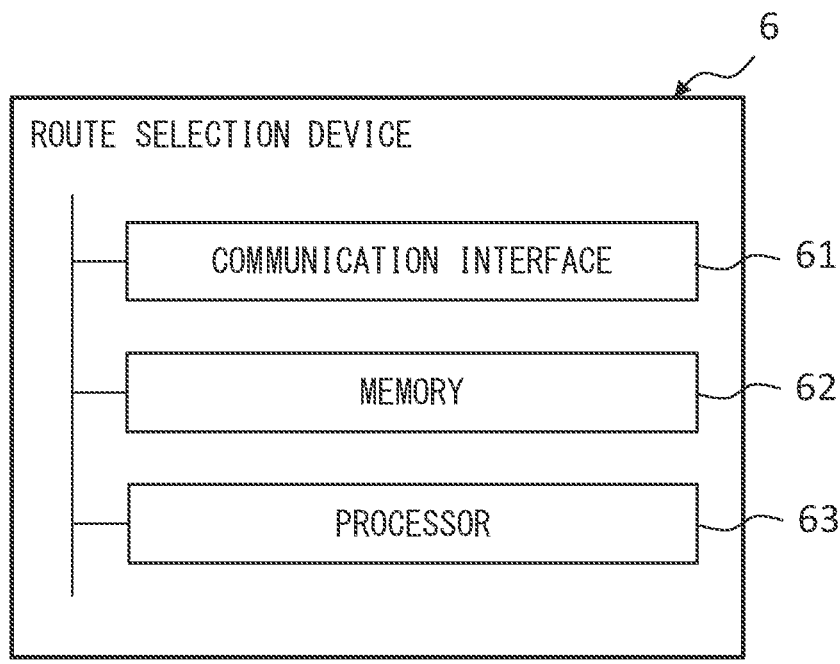
FIG. 2 schematically illustrates the hardware of the route selection device.
FIG. 3 illustrates an example of a score table.

FIG. 2 schematically illustrates the hardware of the route selection device 6. The route selection device 6 includes a communication interface 61, a memory 62, and a processor 63.

The communication interface 61, which is an example of a communication unit, includes a communication interface circuit for connecting the route selection device 6 to the in-vehicle network. The communication interface 61 provides received data for the processor 63, and outputs data provided from the processor 63 to an external device.

The memory 62, which is an example of a storage unit, includes volatile and nonvolatile semiconductor memories. The memory 62 stores various types of data used for processing by the processor 63, such as a score table defining a condition for determining a score for each lane change location, and a distance difference threshold for determining whether a candidate partial route is excluded, based on a travel distance to a waypoint. The memory 62 also stores various application programs, such as a route selection program for executing a route selection process.

FIG. 3 illustrates an example of the score table.

In a score table 621, a score is associated with a lane change location on a partial route, depending on the travel distance to the end point of the partial route and whether automated travel by the travel controller 5 is possible at the lane change location. The partial route refers to a route leading from the current position of the vehicle 1 to a waypoint between the current position and a destination. The end point of the partial route corresponds to this waypoint.

In the score table 621, for example, one point is associated with a lane change location where a lane change by automated driving (an automated LC) is possible for the case that the travel distance to the end point of the partial route is up to 500 m, and eight points for the case that this distance is 2000 m or more. Thus, in the score table 621, the score of a lane change location close to the end point of a partial route is weighted lower than that of a lane change location far from the end point of a partial route.

In the score table 621, for example, two points are associated with a lane change location such that the travel distance to the end point of the partial route is 500 m to 1000 m for the case that an automated LC is possible, and four points for the case that an automated LC is impossible. Thus, in the score table 621, the score of a lane change location where an automated LC is possible is weighted lower than that of a lane change location where an automated LC is impossible.

The processor 63, which is an example of a control unit, includes one or more processors and a peripheral circuit thereof. The processor 63 may further include another operating circuit, such as a logic-arithmetic unit, an arithmetic unit, or a graphics processing unit.

Figure 4:
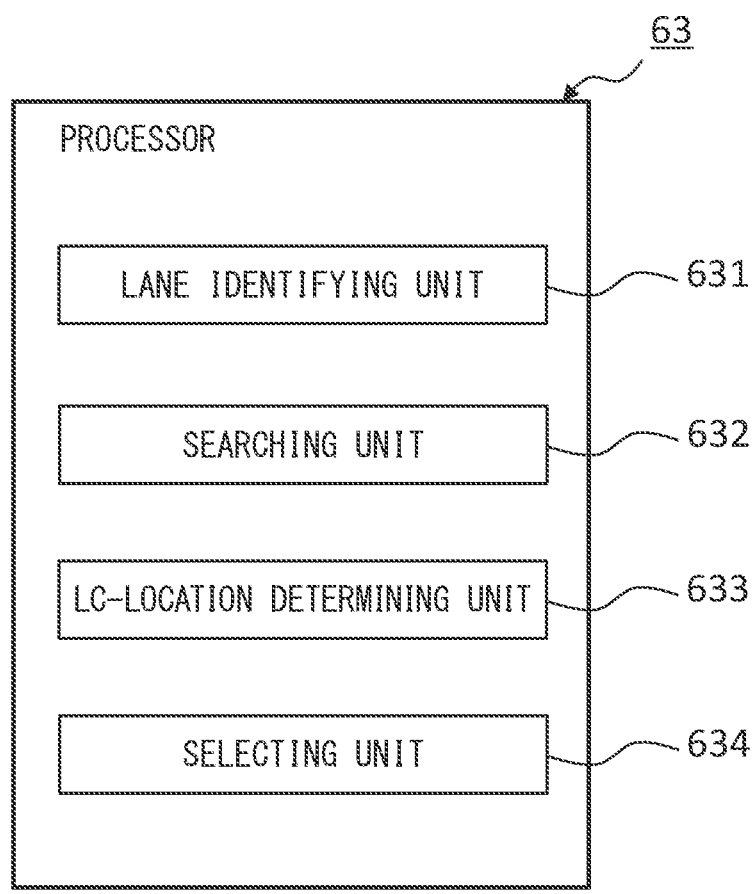
FIG. 4 is a functional block diagram of a processor included in the route selection device.

FIG. 4 is a functional block diagram of the processor 63 included in the route selection device 6.

The processor 63 of the route selection device 6 includes, as its functional blocks, a lane identifying unit 631, a searching unit 632, an LC-location determining unit 633, and a selecting unit 634. These units included in the processor 63 are functional modules implemented by a program executed on the processor 63, or may be implemented in the route selection device 6 as separate integrated circuits, microprocessors, or firmware.

The lane identifying unit 631 inputs an image received from the camera 2 via the input/output interface into a classifier that has been trained to detect features shown in an image, thereby detecting features near the vehicle 1. The lane identifying unit 631 then identifies the position of the lane on which the vehicle 1 is traveling, based on the detected features.

The searching unit 632 searches for candidate partial routes leading from the current position of the vehicle 1 indicated by a positioning signal outputted by the GNSS receiver 3 to a waypoint on a route between the current position and a destination. First, the searching unit 632 selects a node on a route between the current position and the destination as a waypoint. The node herein refers to a node in a representation of a road network, and examples thereof include an intersection and a location on a road including multiple lanes where a lane change can be made. Next, the searching unit 632 refers to the high definition map stored in the storage device 4, and selects such sections as to connect from the current position to the selected node in accordance with a predetermined route searching technique, such as Dijkstra's algorithm, thereby generating candidate partial routes. The candidate partial routes may include the route used for travel control by the travel controller 5.

Of the nodes on the route between the current position and the destination, the searching unit 632 selects a second or subsequent node from the current position. The searching unit 632 selects a node included in an area shown in the high definition map stored in the storage device 4. An upper limit may be set for the number of nodes selected by the searching unit 632. In this case, the searching unit 632 may select nodes in order of increasing distance from the current position.

The LC-location determining unit 633 refers to the high definition map stored in the storage device 4 to determine a lane change location where a lane change will be made for each of the candidate partial routes found by searching. The node determined as a lane change location is a location where a lane change can be made on a road including multiple lanes. If the vehicle 1 cannot travel to the end point of a partial route on the current travel lane identified by the lane identifying unit 631, the LC-location determining unit 633 determines a node on the partial route as a lane change location. Even if the vehicle 1 can travel to the end point of a partial route on the current travel lane identified by the lane identifying unit 631, the LC-location determining unit 633 may determine a node on the partial route as a lane change location.

The selecting unit 634 refers to the score table 621 to calculate the total of the scores, which are defined for respective lane change locations, for each of the candidate partial routes found by searching, and selects a candidate partial route having a minimum total score. The score is weighted depending on the position of the determined lane change location or whether automated travel is possible at the lane change location.

The selecting unit 634 may select the partial route with exclusion of a candidate partial route such that a difference between a travel distance along the candidate partial route and a travel distance along a route used for automated travel by the travel controller 5 exceeds a distance difference threshold from the candidate partial routes found by searching. This travel distance is a distance between the current position and the end point of the candidate partial route. Operating in this way, the route selection device 6 can select a route involving fewer lane changes at locations beyond the driver expectations without detouring more than necessary.

The route selection device 6 may be implemented as a navigation device that generates a route leading from a start point to a destination. Alternatively, the route selection device 6 may be implemented in the same ECU as the travel controller 5.

Figure 5:
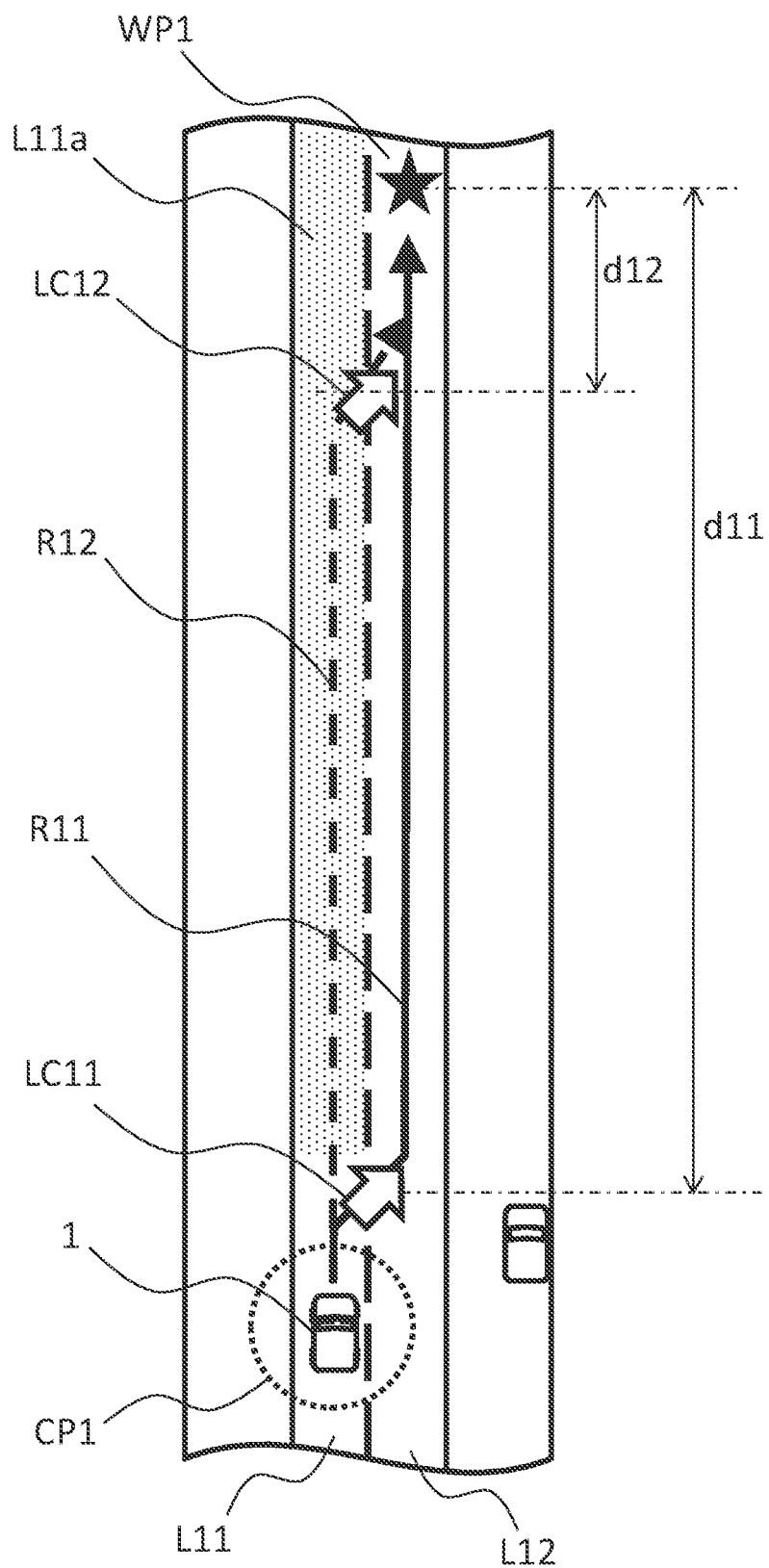
FIG. 5 is a diagram for describing a first example of route selection.

FIG. 5 illustrates a first example of route selection.

The vehicle 1 is traveling on a route R11 from a current position CP1 on a lane L11 to a waypoint WP1 on a lane L12. The lane L11 includes a permission lane 11a on which a vehicle satisfying a predetermined condition is permitted to travel. This predetermined condition is, for example, that the number of vehicle occupants is not less than a predetermined number. On the route R11, a lane change will be made at a lane change location LC11 just before the permission lane 11a. The distance from the lane change location LC11 to the waypoint WP1 is d11.

At the current position CP1, a route R12 is searched for as a candidate partial route. On the route R12, a lane change will be made at a lane change location LC12 in the permission lane L11a. The distance from the lane change location LC12 to the waypoint WP1 is d12, and d12 is shorter than d11. Hence, the score of the route R12 is lower than that of the route R11, and the route R12 is selected as a partial route.

This example is based on the assumption that the vehicle 1 satisfies the predetermined condition. If the vehicle 1 does not satisfy the predetermined condition, the driver of the vehicle 1 cancels the selection of the route R12. In this case, the route selection device 6 preferably displays the fact that the route R12 has been selected and the condition for traveling on the route R12, for example, on a meter display (not shown).

Figure 6:
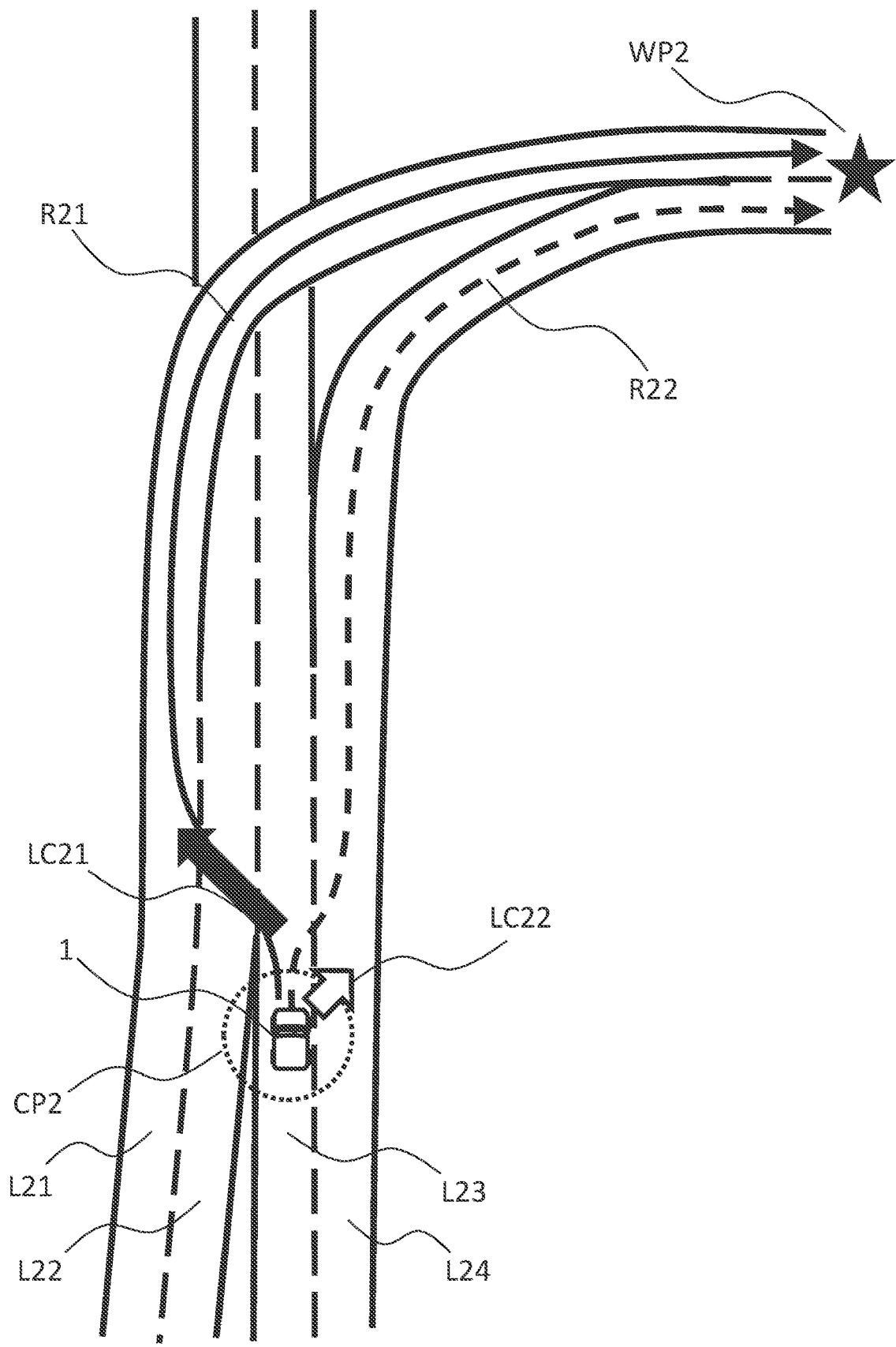
FIG. 6 is a diagram for describing a second example of route selection.

FIG. 6 illustrates a second example of route selection.

The vehicle 1 is traveling on a road including lanes L23 and L24 at a current position CP2 on the lane L23. The road including the lanes L23 and L24 merges with a road including lanes L21 and L22, becoming four lanes. Of these, the lanes L21 and L24 branch and lead to a waypoint WP2.

The travel distance from the current position CP2 to the waypoint WP2 is shorter along a route R21 on the lane L21 than along a route R22 on the lane L24. For this reason, the travel controller 5 is controlling travel according to the route R21. In this case, two successive lane changes are required at a lane change location LC21, and this location cannot be passed under control by the travel controller 5. For this reason, to travel along the route R21, the travel controller 5 will request the driver to switch to manual driving at the lane change location LC21.

At the current position CP2, the route R22 is searched for as a candidate partial route. On the route R22, a single lane change from the lane L23 to the lane L24 is required, and this location can be passed under control by the travel controller 5. Hence, the score of the route R22 is lower than that of the route R21, and the route R22 is selected as a partial route.

Figure 7:
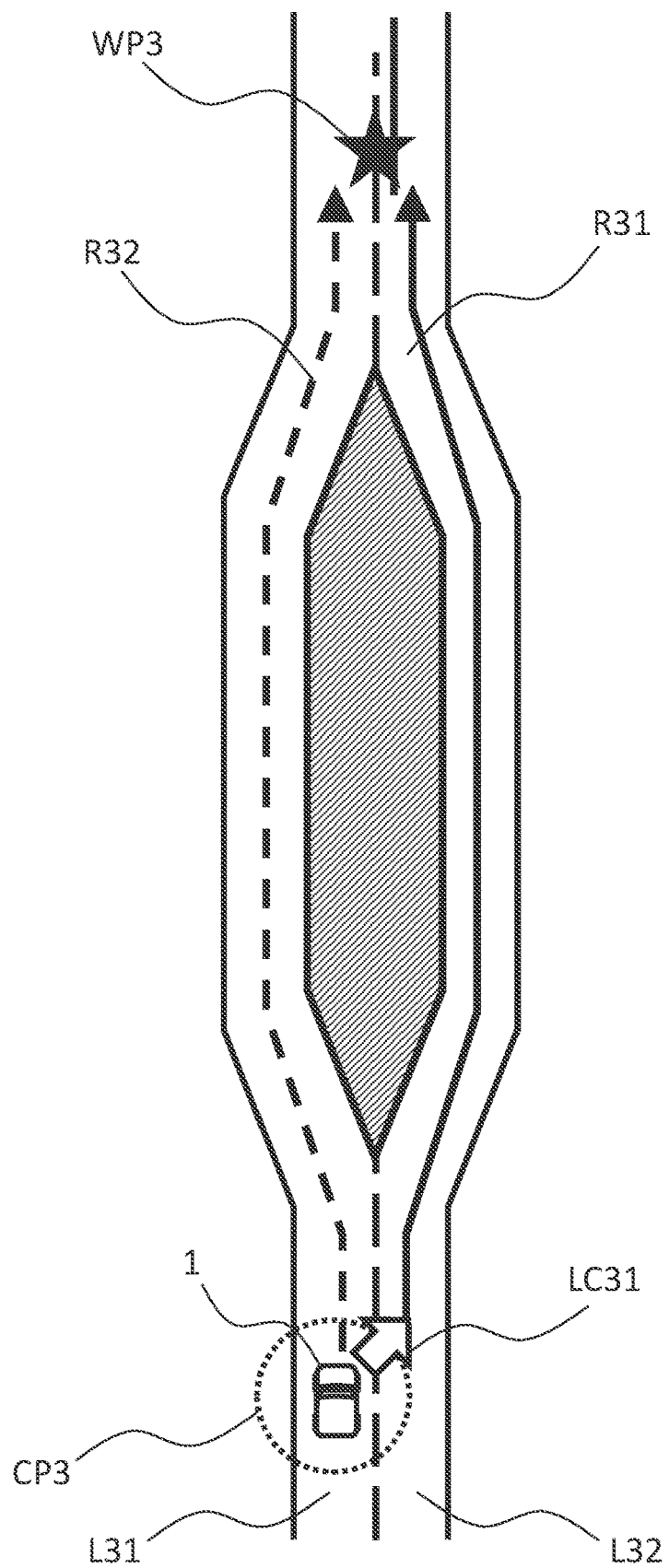
FIG. 7 is a diagram for describing a third example of route selection.

FIG. 7 illustrates a third example of route selection.

The vehicle 1 is traveling on a road including lanes L31 and L32 at a current position CP3 on the lane L31. The lanes L31 and L32 branch ahead of this position, and then merge just before a waypoint WP3.

The lane L32 is selected on a route R31 used for travel control by the travel controller 5. Thus, on the route R31, a lane change will be made at a lane change location LC31.

At the current position CP3, a route R32 is searched for as a candidate partial route. On the route R32, the lane L31 is selected, and it is possible to travel without any lane change. Hence, the score of the route R32 is lower than that of the route R31, and the route R32 is selected as a partial route.

FIG. 8 is a flowchart of a route selection process. The route selection device 6 repeats the route selection process every predetermined interval (e.g., intervals of 30 seconds) while the vehicle 1 travels on a route, based on control by the travel controller.

First, the lane identifying unit 631 identifies the position of the lane on which the vehicle 1 is traveling (step S1). Next, the searching unit 632 searches for candidate partial routes leading from the current position (step S2). Next, the LC-location determining unit 633 determines lane change locations on the candidate partial routes (step S3). Then, the selecting unit 634 selects, as a partial route, a candidate partial route having a minimum total score regarding the lane change location from the candidate partial routes (step S4).

Executing the route selection process in this way, the route selection device 6 can select a route involving few lane changes at locations beyond the driver expectations.

According to a modified example, the score of a lane change location may be weighted so that the shorter the distance to an adjacent lane change location, the higher the score. Weighting the scores in this way, the route selection device 6 can select a partial route with sufficient time to make a lane change.

According to another modified example, the selecting unit 634 may select, as a partial route, a candidate partial route including fewer lane change locations from the candidate partial routes having the same total score regarding the lane change location. With such operation of the selecting unit 634, the route selection device 6 can select a partial route involving fewer lane changes.

Note that those skilled in the art can apply various changes, substitutions, and modifications without departing from the spirit and scope of the present disclosure.

What is claimed is:

1. A route selection device comprising a processor configured to
    identify a position of a lane on which a vehicle is traveling;
    search for candidate partial routes leading from a current position of the vehicle to a waypoint on a route leading from a start point to a destination, the waypoint being located between the current position and the destination;
    determine a lane change location where a lane change will be made for each of the candidate partial routes found by searching; and
    select, as a partial route, a candidate partial route having a minimum total score regarding the lane change location from the candidate partial routes found by searching, the minimum total score being weighted depending on the position of the determined lane change location or whether automated travel is possible at the lane change location,
    wherein a score of the lane change location that is used to calculate the minimum total score is weighted so that the lane change location close to the waypoint has a lower score than the lane change location far from the waypoint so that the lane change is made at a location outside a driver's perception, and
    wherein the processor selects, as the partial route, a candidate partial route including fewer lane change locations from the candidate partial routes having the same minimum total score.

2. The route selection device according to claim 1, wherein the minimum total score is weighted so that a lane change location where automated travel is possible has a lower score than a lane change location where automated travel is impossible.

3. The route selection device according to claim 1, wherein the minimum total score is weighted so that the shorter the distance to an adjacent lane change location, the higher the score.

4. The route selection device according to claim 1, wherein the processor selects the partial route with exclusion of a candidate partial route such that a difference between a travel distance along the candidate partial route and a travel distance along a route used for control of automated travel exceeds a distance difference threshold from the candidate partial routes found by searching, the travel distance being a distance between the current position and the waypoint.

5. A method for selecting a route, comprising:
    identifying a position of a lane on which a vehicle is traveling;
    searching for candidate partial routes leading from a current position of the vehicle to a waypoint on a route leading from a start point to a destination, the waypoint being located between the current position and the destination;
    determining a lane change location where a lane change will be made for each of the candidate partial routes found by searching; and
    selecting, as a partial route, a candidate partial route having a minimum total score regarding the lane change location from the candidate partial routes found by searching, the minimum total score being weighted depending on the position of the determined lane change location or whether automated travel is possible at the lane change location,
    wherein a score of the lane change location that is used to calculate the minimum total score is weighted so that the lane change location close to the waypoint has a lower score than the lane change location far from the waypoint so that the lane change is made at a location outside a driver's perception, and
    from the candidate partial routes having the same minimum total score, a candidate partial route including fewer lane change locations is selected as the partial route.

\* \* \* \* \*